US012762501B2

(12) United States Patent
Lundstrom et al.

(10) Patent No.: US 12,762,501 B2
(45) Date of Patent: Oct. 13, 2026

(54) SYSTEMS AND METHODS FOR IMPROVED AGENCY MANAGEMENT

(71) Applicant: Integrity, LLC, Dallas, TX (US)

(72) Inventors: Steven James Lundstrom, Elkhorn, NE (US); Harsh Singla, Dallas, TX (US); Kunal Uppal, Allen, TX (US)

(73) Assignee: Integrity, LLC

(*) Notice: Subject to any disclaimer, the term of this patent is extended or adjusted under 35 U.S.C. 154(b) by 86 days.

(21) Appl. No.: 18/303,139

(22) Filed: Apr. 19, 2023

(65) Prior Publication Data

US 2023/0334409 A1 Oct. 19, 2023

Related U.S. Application Data

(60) Provisional application No. 63/332,446, filed on Apr. 19, 2022.

(51) Int. Cl.
*G06Q 10/0631* (2023.01)
*G06F 3/0485* (2022.01)
*G06Q 10/0633* (2023.01)
*G06Q 10/0639* (2023.01)

(52) U.S. Cl.
CPC ..... *G06Q 10/06398* (2013.01); *G06F 3/0485* (2013.01); *G06Q 10/063112* (2013.01); *G06Q 10/063114* (2013.01); *G06Q 10/0633* (2013.01); *G06F 2203/04806* (2013.01)

(58) Field of Classification Search
None
See application file for complete search history.

(56) References Cited

U.S. PATENT DOCUMENTS

| | | | | |
|---|---|---|---|---|
| 8,666,788 B1 | | 3/2014 | Syed | |
| 2006/0100912 A1* | | 5/2006 | Kumar | G06F 16/951 705/4 |
| 2012/0158465 A1* | | 6/2012 | Golembiewski | G06Q 10/06 705/7.42 |
| 2016/0155181 A1 | | 6/2016 | Romaya et al. | |
| 2020/0219163 A1 | | 7/2020 | Kumar | |

FOREIGN PATENT DOCUMENTS

CN 109460884 A * 3/2019 ..... G06Q 10/063112

OTHER PUBLICATIONS

Chandan Kumar et al., "Assessing end-user interaction for multi-criteria local search with heatmap and icon-based visualizations," Nov. 5, 2013, ACM SIGSPATIAL International Workshop on Map Interaction (MapInteract '13). Association for Computing Machinery, pp. 13-19. (Year: 2013).*
International Search Report and Written Opinion in International Appln. No. PCT/US2023/019108, mailed on Jun. 16, 2023, 15 pages.
International Preliminary Report on Patentability in International Appln. No. PCT/US2023/019108, mailed on Oct. 31, 2024, 9 pages.

* cited by examiner

*Primary Examiner* — Amanda Gurski
(74) *Attorney, Agent, or Firm* — Fish & Richardson P.C.

(57) ABSTRACT

Some computing systems and computer-implemented methods detailed herein provide an improved user interfaces to facilitate seamless management, monitoring, and selection of targeted insurance agents contracted with, or to be contracted with, particular insurance providers.

13 Claims, 9 Drawing Sheets

SYSTEMS AND METHODS FOR IMPROVED AGENCY MANAGEMENT

CROSS-REFERENCE TO RELATED APPLICATIONS

This application claims priority to U.S. Provisional Patent Application No. 63/332,446, filed on Apr. 19, 2022, the contents of which are incorporated herein by reference in its entirety.

TECHNICAL FIELD

This document describes computer systems, user interfaces, and computer-implemented methods for providing improved agency management and communication between, for example, insurance agencies, insurance agents, and insurance providers.

BACKGROUND

Insurance providers may often work through a field marketing organization ("FMO") for purposes of selecting and contracting with any of thousands of insurance agents in particular geographic or product category. Some FMOs can employ a computer-implemented operation system that facilitates contracting between the insurance providers and those selected insurance agents. Such operation systems employed by the FMO may provide intermediate communications between the insurance carriers and the contacted insurance agents, for example, when an insurance agent sells a proposed policy to an end customer and the carrier must then evaluate the proposed policy for a decision to formally issue that policy to the end customer. Given that there are hundreds of thousands of independent insurance agents and hundreds of insurance carriers, the complexity of selecting, contracting, monitoring, and managing such relationships (e.g., between insurance carriers and insurance agents) is continually increasing.

SUMMARY

This document describes techniques, methods, systems, and other mechanisms for improving agency management for insurance agencies, insurance agents, and insurance providers. Some embodiments of systems and methods detailed herein include providing improved user interfaces at computing devices operated by an insurtech provider (e.g., such as an FMO in particular implementations) to facilitate seamless management, monitoring, and selection of targeted insurance agents contracted with, or to be contracted with, particular insurance providers. Additionally, some computer platforms described herein can uniquely organize and present data on insurance products, agents, and historical agent performance for purposes of improved pairing of insurance agents to particular insurance provider partners and improved distribution of those insurance products.

Among other benefits, the presently described computing systems, user interfaces, and methods provide a more intuitive experience for an insurtech provider to facilitate, manage, and track the performance of insurance agents engaged with the insurtech provider by improving the efficiency of locating an appropriate insurance agent for a particular lead, improving the management of tasks for agents and administrators, and by improving the efficiency of document management within the insurtech provider and between the insurance providers and those insurance agents contracted with the insurance providers. The computing systems, user interfaces, and methods described herein provide a unique reorganization of insurance agency data and a user-friendly mechanism for improving insurance agency management.

In some embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that includes receiving, by a computing system, information for a plurality of insurance agents, the information including agent names, one or more carriers associated with each agent, one or more locations of each insurance agent. The computer-implemented method also includes generating, by the computing system, an agent profile for each insurance agent. The method also includes tracking agent metrics for each insurance agent, the agent metrics including: a volume of contracts sold, a number of policy types sold, an agent debt, calculating a respective agent score for each insurance agent, the respective agent score being calculated based on the agent metrics. The method also includes assigning the respective agent score to each agent profile. The method also includes transmitting, by the computing system over a network to a first remote computing device, agent profile user interface information that, when rendered by the first remote computing device causes the first remote computing device to display a first user interface, the first user interface including: (i) an agency criteria field that is user-searchable. The method also includes (ii) a carrier criteria field that is user-searchable. The method also includes (iii) one or more location fields that are user searchable. The method also includes and (iii) an interactive map, receiving, by the computing system from the first remote computing device, search criteria that includes one or more user inputs in the agency criteria field, the carrier criteria field, and the one or more location fields. The method also includes determining, by the computing system, one or more agent profiles that satisfy the search criteria of the one or more user inputs. The method also includes ranking, by the computing system, the one or more agent profiles that meet the search criteria based on the agent metrics and the respective agent scores. The method also includes generating, by the computing system and for display at the interactive map based on the one or more location fields, a result set of one or more agent profiles that meet the search criteria that are ranked based on the agent metrics and the respective agent scores. Other embodiments of this aspect include corresponding computer systems, apparatus, and computer programs recorded on one or more computer storage devices, each configured to perform the actions of the methods.

One general aspect includes one or more processors; and one or more computer-readable devices including instructions that, when executed by the one or more processors, cause the computing system to perform operations. The operations include receiving information for a plurality of insurance agents, the information including agent names, one or more carriers associated with each agent, and one or more locations of each insurance agent; calculating a respective agent score for each insurance agent, the respective agent score being calculated based on one or more agent metrics, the one or more agent metrics including a volume of contracts sold, a number of policy types sold, an agent debt; receiving search criteria that includes one or more user inputs in an agency criteria field, an carrier criteria field, and one or more location fields; determining one or more agent profiles that satisfy the search criteria of the one or more user inputs; and generating, for display at an interactive map based on the one or more location fields, a result set of one or more agent profiles that meet the search criteria that are ranked based on the agent metrics and the respective agent scores. Other embodiments of this aspect include corresponding computer systems, apparatus, and computer programs recorded on one or more computer storage devices, each configured to perform the actions of the methods.

One general aspect includes a computer-implemented method. The computer-implemented method includes receiving, at a first remote computing device over a network from a computing system, information for a plurality of insurance agents, the information including agent names, one or more carriers associated with each agent, one or more locations of each insurance agent. The computer—implemented method also includes receiving, at the first remote computing device over the network from the computing system, an agent profile for each insurance agent, the agent profile includes agent metrics including: a volume of active contracts, a number of policy types sold, an agent debt, and a respective agent score for each insurance agent, the respective agent score being calculated based on the agent metrics. The method also includes receiving, at the first remote computing device over the network from the computing system, agent profile user interface information. The method also includes displaying, at the first remote computing device, a first user interface, the first user interface including: (i) an agency criteria field that is user-searchable. The method also includes (ii) a carrier criteria field that is user-searchable. The method also includes (iii) one or more location fields that are user searchable. The method also includes and (iii) an interactive map, transmitting, from the first computing device to the computing system, search criteria that includes one or more user inputs in the agency criteria field, the carrier criteria field, and the one or more location fields. The method also includes and displaying, at the interactive map of the first user interface based on the one or more location fields, a result set of one or more agent profiles that meet the search criteria that are ranked based on the agent metrics and the respective agent scores. Other embodiments of this aspect include corresponding computer systems, apparatus, and computer programs recorded on one or more computer storage devices, each configured to perform the actions of the methods.

Implementations may include one or more of the following features. The computer-implemented method where the agent profile for each insurance agent further may include one or more agent activities, the agent activities include at least one of leads the agent is working, quotes the agent is running, and enrollments the agent has submitted. The computer-implemented method may include: assigning each of the agent profiles to one or more agent groups; and assigning each of the agent profiles a reporting level in each of the agent groups the agent profile is assigned to. Implementations of the described techniques may include hardware, a method or process, or computer software on a computer-accessible medium.

One general aspect includes a computing system that includes one or more processors; and one or more computer-readable devices including instructions that, when executed by the one or more processors, cause the computing system to perform operations. The instructions include receiving an agent profile for each of a plurality of insurance agents, the respective agent profiles include agent metrics including: a volume of active contracts, a number of policy types sold, an agent debt, and a respective agent score for each insurance agent, the respective agent score being calculated based on the agent metrics; displaying a first user interface, the first user interface including one or more location fields that are user searchable; and an interactive map; and displaying, at the interactive map of the first user interface based on the one or more location fields, a result set of one or more agent profiles that meet search criteria that are ranked based on the agent metrics and the respective agent scores.

One general aspect includes one or more processors; and one or more computer-readable devices including instructions. The instructions include receiving information for a plurality of insurance agents, the information including agent names, one or more carriers associated with each agent, and one or more locations of each insurance agent; receiving one or more user inputs at a user interface; displaying a response to the one or more user inputs at the user; displaying a prompt that includes one or more user selectable criteria; receiving a user selection at the one or more user selectable criteria; and generating, for display at the user interface, a response that includes information associated with the one or more user selectable criteria that the user selected.

One general aspect includes one or more processors; and one or more computer-readable devices including instructions. The instructions include receiving information for a plurality of insurance agents, the information including agent names and licensing information for each of the plurality of insurance agents; communicating the licensing information with one or more regulating bodies; receiving updated licensing information from the one or more regulating bodies; and updating the licensing information for each of the plurality of insurance agents based on the updated licensing information.

One general aspect includes one or more processors; and one or more computer-readable devices including instructions. The instructions include receiving search criteria at a user interface for one or more documents; displaying a result set that includes one or more documents at the user interface based on the search criteria; receiving a selection of at least one of the documents; displaying the document that includes one or more form-fillable areas; receiving user inputs in the form-fillable areas; completing the document when the form-fillable areas are complete; and sending a complete document to a carrier. Other embodiments of this aspect include corresponding computer systems, apparatus, and computer programs recorded on one or more computer storage devices, each configured to perform the actions of the methods.

Particular implementations can, in certain instances, realize one or more of the following advantages. The streamlined and efficient user interfaces described herein allow for insurance agencies to easily navigate a complex and confusing system, thereby improving the user experience and reducing the amount of time that insurance agencies need to interact with the automated system. This reduction in time spent navigating the automated system reduces power consumption and communication bandwidth as the improved agency management system described herein reduces the amount of communication needed and the time spent by users with respect to traditional systems. The streamlined and efficient user interfaces described herein facilitate improved processes for contracting between insurance agents and insurance providers which can reduce the amount of time and delay required for insurance agents to be contracted with insurance providers. This increased efficiency facilitates an increased ability for insurance agents to sell insurance policies for insurance providers. The streamlined and efficient user interfaces described herein facilitate improved processes for task management, document tracking, reporting, incentive program administration, policy/policyholder administration, agent lead management, commissions processing, and supplies fulfillment which improve the efficiency of the insurance agency and reduce the amount of communication needed and the time spent by users with respect to traditional systems.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
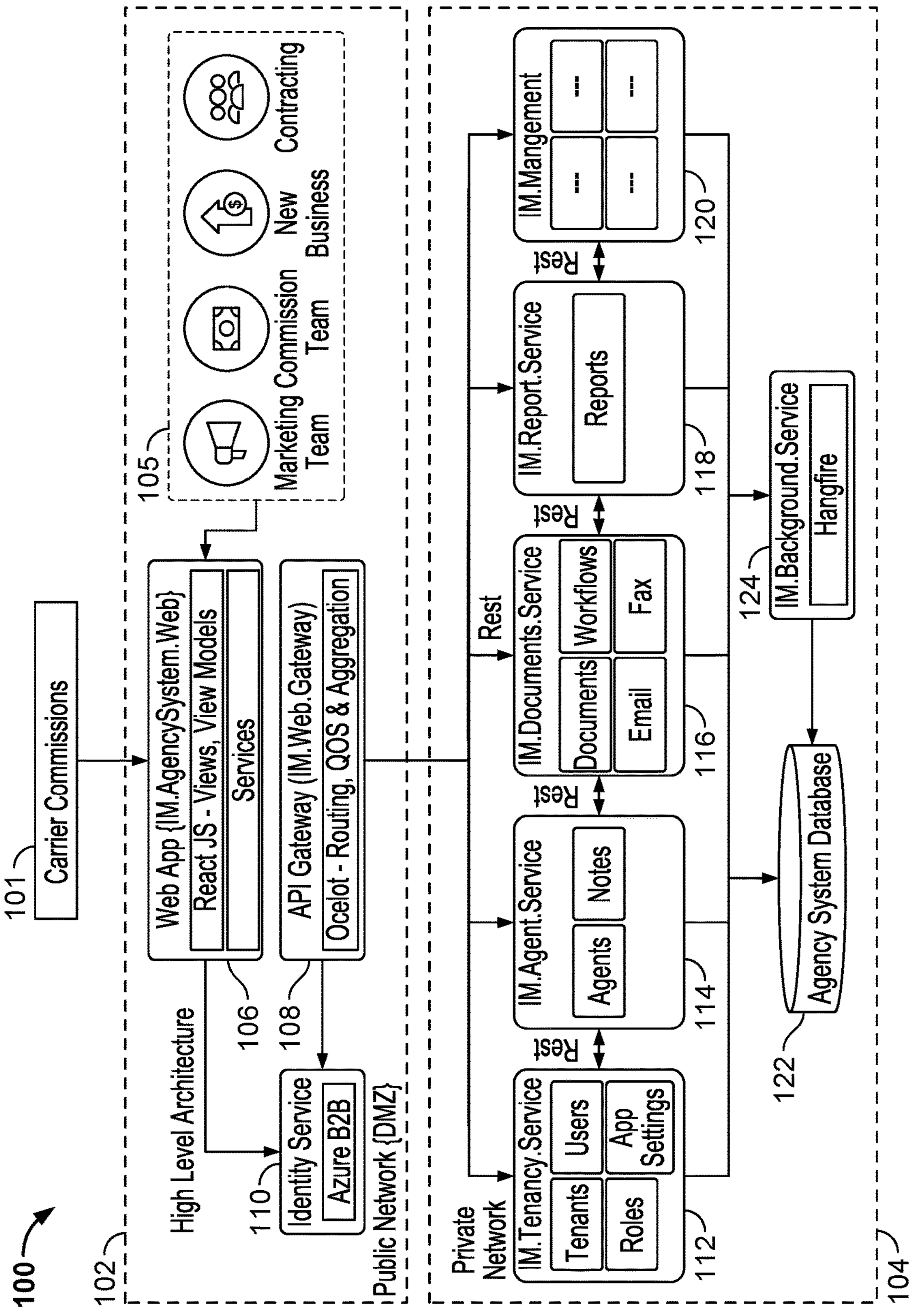
FIG. 1 shows an example system architecture for facilitating agency management, consistent with embodiments of this disclosure.

Referring to FIG. 1, some embodiments of an architecture of a system 100 for facilitating agency management can be used by an insurtech provider (e.g., such as an FMO in particular implementations) to facilitate improved communications and targeted engagement between insurance providers and insurance agencies. The system 100 includes inputs from carrier commissions 101 that can be input into a first network 102, the first network is connected to a second network 104. In some aspects, the first network 102 and the second network 104 can be connected to each other via a wired and/or wireless connection.

The system 100 receives carrier commissions 101 as inputs at the web application 106. The carrier commissions 101 can be used as an import for determining commissions for one or more agents, and can also be used to build insurance policies and premiums based on the carrier commissions 101. The carrier commissions 101 can be direct inputs into the system 100 at the web application 106 and/or the carrier commissions 101 can be automatically pulled from documents uploaded to the web application 106 from one or more input sources 105.

The one or more input sources 105 can include a marketing team, a commission team, new business, and/or a contracting team that each can provide additional inputs to the web application 106. In some aspects, the one or more input sources 105 can provide user inputs at the web application 106, the user inputs can include the entry of policy details, the entry of contract details, and the entry of commission details.

The web application 106 receives the inputs from the carrier commissions 101 and the one or more input sources 105. The web application 106 can process the inputs from the commissions 101 and one or more input sources 105 by extracting information from policy documents, contracts, and commissions. The extracted information can be rendered by the web application 106 to create intuitive user interfaces that are described in further detail below in reference to at least FIGS. 2, 3A, 3B, 4A, 4B, and 5-6.

The web application 106 is connected to an application programming interface (API) gateway 108. The API gateway 108 can be a management tool that sits between the web application 106 and a collection of backend services on the second network 104. The API gateway 108 can accept application programming interface (API) calls, aggregate the various services required to fulfill them, and return the appropriate result.

The web application 106 and API gateway 108 are connected to an identity service 110. The identity service 110 can facilitate cross-organization collaboration through authentication. The identity service 110 can allow for invitations to be sent to guest users to collaborate with the insurtech provider, which can facilitate seamless inter-agency and intra-agency operations and management.

The second network 104 can connect to the first network 102 via the API gateway 108. The second network 104 includes a tenancy service 112, an agent service 114, a document service 116, a report service 118, and management service 120. Each of the tenancy service, the agent service, the document service, the report service, and the management service 120 are connected to an agency system database 122 and a background service 124.

The tenancy service 112 can store and update a plurality of tenants, users, roles, and application settings. The agent service 114 can store and update a plurality of agents and agent notes. The document service 116 can store and update a plurality of documents, workflows, emails, and faxes. The report service 118 stores and updates reports, the reports can be aggregated from throughout the system 100. The management service 120 can include one or more services, the one or more services can include an accounting service, an address service, a business unit configuration service, a commission service, a contract service a dialer service, a document service, an identity service, an insured service, a lead service, a messaging service, a producer search service, a producer service, a product service, a supply order service, a task service, and a workflow service.

The management service 120 can include any combination of services, including all the services provided. In some aspects, the accounting service includes modules that include agent debt import, bank, bank account, bank deposit, credit card, credit check, debt, journal report, payment plan, payout level and accounting related reports. In some aspects, the address service, includes modules that include get address recommendations and get city, state, county by zip code. In some aspects, the business unit configuration service includes modules that include announcement, marketing events and web link.

In some aspects, the commission service includes modules that include commission pay from, commission plan payment source, commission plans, commission plan status, commission process, commission statements, funeral home statements, merge statement division, and renewal backout. In some aspects, the contract service includes modules that include agent certificates, appointments, bulk mail shipping configuration, carrier, carrier groups, certification, communications, company license number default, contract, division, level, license splitter, license status reason, locations, marketer mail configuration, state license and summary.

In some aspects, the dialer service includes modules that include call log, generate active call list, generate prospective call list and remove call list. In some aspects, the document service includes modules that include document, document file type, document management and reports. In some aspects, the identity service includes modules that include action log, app setting, audit log, group, password list, role, and user. In some aspects, the insured service includes modules that include customer, annuity premium, excess premium, surplus lines (SL) premium, payment plan, policy, policy notes, renewal and trip points.

In some aspects, the lead service includes modules that include lead, marketer lead, sales operations lead, sales operations unmatched lead, background process, agent lead disabled carrier, In some aspects, the messaging service includes modules that include messaging and notifications. In some aspects, the producer search service includes modules that include agent searching.

In some aspects, the producer service includes modules that include agent, address, contact, marketing event, note, payee and principal. In some aspects, the product service includes modules that include product, product category, product subcategory, product line, product type. In some aspects, the supply order service includes modules that include supply order and divisions. In some aspects, the task service includes modules that include tasks. In some aspects, the workflow service includes modules that include workflow(s).

Additionally, the second network 104 can include utility services and message broker services. The utility services can include an agency common that has configuration management, exception management, logging, user context, blob storage manager, cache manager, ftp client, email helper, date, and time. The utility services can include a domain service that includes all the entities related to the database. The utility service can include a report service that includes helper components related to excel and pdf generation. The utility service can include a security service that includes security implementation for the application.

The message broker service provides an architectural pattern for message validation, transformation, and routing. The message broker service mediates communication among services, minimizing the mutual awareness that service should have of each other to be able to exchange messages, effectively implementing decoupling. The messaging services can include one or more APIs that include a notification controller that exposes end points for sending email, fax, and FTP. The APIs can include a message controller that exposes end points for sending messages for background processing, and each message can have a topic with specific message handlers. Additionally, the APIs can include message handlers, push notifications, and messaging UI applications.

Figure 2:
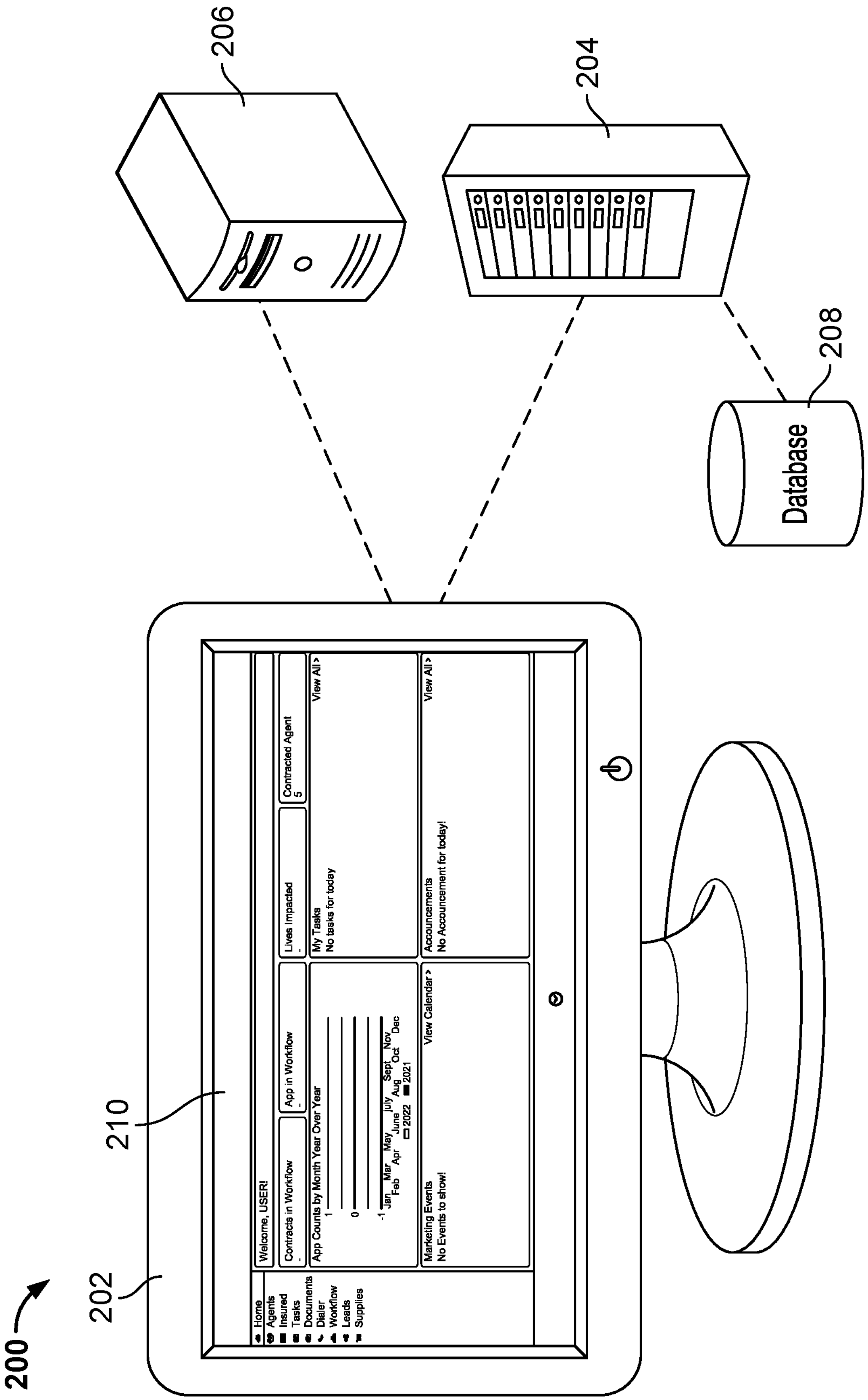
FIG. 2 shows an example computing system for facilitating agency management.

Referring now to FIG. 2, the system 100 can be used to achieve an example computing environment 200 in which a client computing device 202 shows a user interface 210 that provides access to, and communication with, features of the agency management system 100. The client computing device 202 communicates over the internet (or another network) with a server system 204 and with one or more other computing devices 206. For example, a user's desktop computer 202 communicates with the server system 204, which hosts some or all components of the first and second networks 102 and 104. The server system 204 that hosts some or all components of the first and second networks 102 and 104 provides user interfaces for providing beneficial information to an insurtech provider, eliciting input from users at the insurtech provider, facilitating communications between the insurtech provider's computing device and one or more computing devices 106 of one or more additional insurtech providers, additional insurance agencies, and streamlines the management of the insurtech provider and the insurance agencies. The server system 204 can have access to one or more databases 208 of information. The server system 204 can, for example, store insurance agent information in the database 208 and retrieve the insurance agent information based on requests received from the client computing device 206. The server system 204 can automatically update information in the database 208 based on detected interactions of the insurance agency with their respective computing devices and based on communications between the computing device 202 of the insurtech provider and the one or more computing devices 206 of the customer, insurance agency, etc.

In the example shown in FIG. 2, the client computing device 202 shows the user interface 210 displaying a home page of the agency management system, the home page displays a variety of interactive dashboard tiles that include a variety of tracked agency metrics. The agency metrics are shown in a dashboard tile view in this example. The user interface 210 can allow the user (at the insurtech provider) to arrange the interactive dashboard tiles in a user-selected viewing orientation. Each agency metric dashboard tile displayed in the user interface 210 includes information on the insurance agency including the number of contracts in the workflow, the number of applications in the workflow, a number of lives impacted, application count by month year over year, a task list, a marketing event list, an announcement dashboard tile, etc. The user (at the insurtech provider) can select a user selectable edit control displayed along with each interactive dashboard tile to edit information about each selected entity. The user can select a particular agency metric dashboard tile to cause the system to display additional detailed information for the selected agency metric.

Figure 3A:
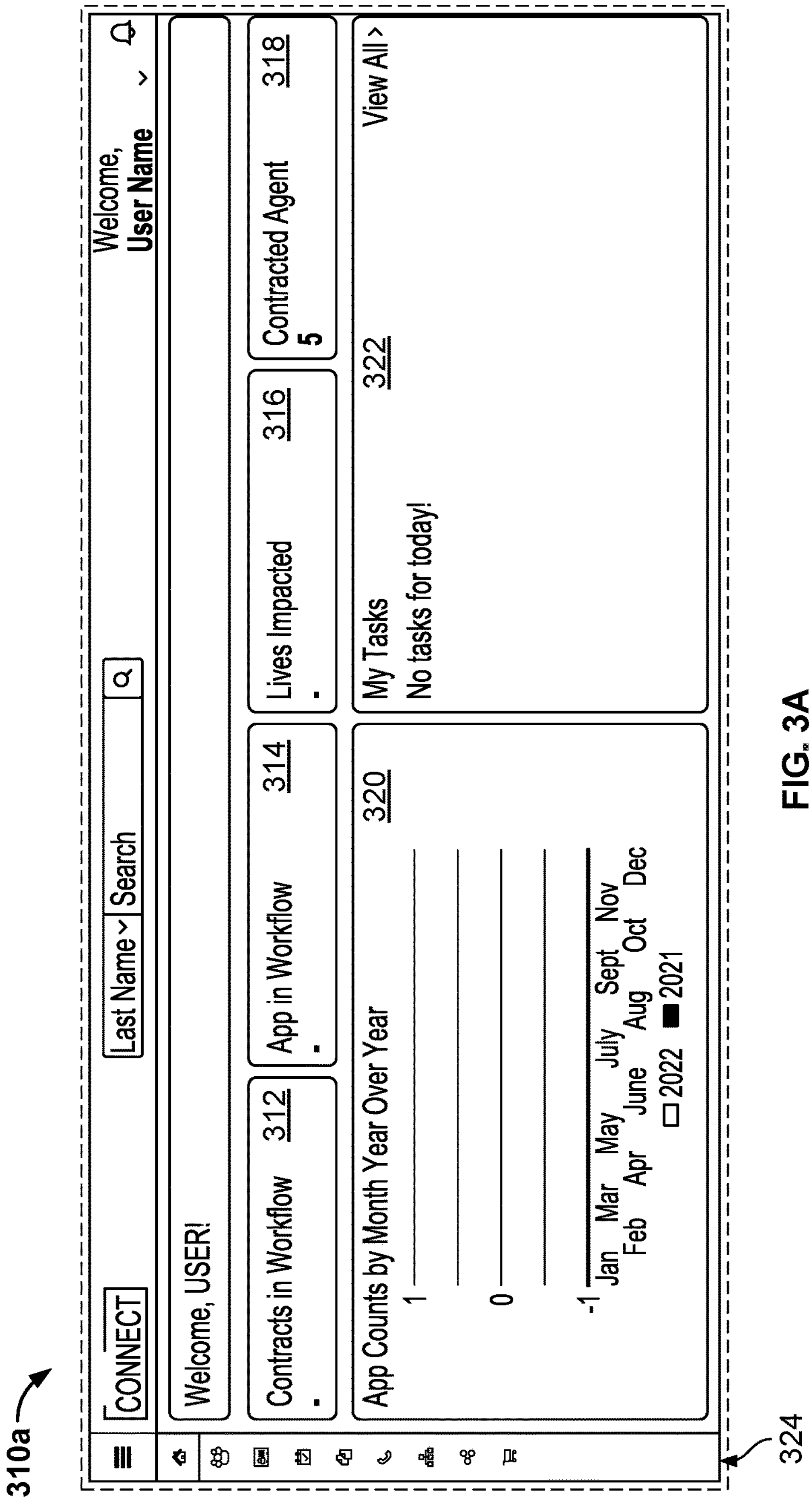
FIG. 3A shows an example user interface displaying an agency management system dashboard interface.

FIG. 3A shows a user interface 310*a* representing an optional version of the user interface 210 of FIG. 2. The user interface 310*a* can, for example, be displayed on the computing device 202. For example, the computing device 202 can receive information from the server system 204 over the internet or another network. A browser executing on the computing device 202 then can, for example, render the information received from the server system 204 to provide the user interface 310*a*. As with the user interface 210, the user interface 310*a* can be a dashboard interface that shows a dashboard tile view of a list of agency metrics for a given insurance agency, and facilitates the navigation of a user through the agency management system.

A first agency metric dashboard tile 312 displayed as a part of the user interface 310*a* includes information for a number of contracts in the workflow. The first agency metric dashboard tile 312 can assist a user in tracking how many contracts are being processed by the agency, and can facilitate improved management of pending contracts.

A second agency metric dashboard tile 314 displayed as a part of the user interface 310*a* includes information for a number of applications in the workflow. The second agency metric dashboard tile 314 can assist a user in tracking how many applications are being processed by the agency, and can facilitate improved management of pending applications.

A third agency metric dashboard tile 316 displayed as a part of the user interface 310*a* includes information for a number of lives impacted. The third agency metric dashboard tile 316 can illustrate the impact of the agency's operations on a number of lives displayed in the third agency metric dashboard tile 316. The number of lives impacted can be aggregated from throughout the system, and includes the number of customers served.

A fourth agency metric dashboard tile 318 displayed as a part of the user interface 310*a* includes information for a number of contracted agents. The fourth agency metric dashboard tile 318 can illustrate the agency's scope and ability to operate based on the number of agents contracted with insurance carriers. The number of contracted agents can be aggregated from throughout the system, and includes the number of agents actively under contract for all carriers managed in the system.

A fifth agency metric dashboard tile 320 displayed as a part of the user interface 310*a* includes a graphical representation of information including application counts by month year over year. The fifth agency metric dashboard tile 320 can illustrate trends for application counts year over year and for each month of the year. The graphical representation can include application counts on the vertical axis and months along the horizontal axis. The graphical representation can include color coded years that can be illustrated next to each other along the horizontal axis at each corresponding month to illustrate the agency's performance year to year and month over month.

The user interface 310*a* can also display a task dashboard tile 322 that illustrates a task list for the user. The task list is user specific and displays all current and/or upcoming tasks.

The user interface 310*a* can also include a navigation bar 324 that includes a plurality of selectable icons that facilitate navigation throughout the agency management system. The selectable icons navigate to a plurality of user interfaces from the user interface 310*a*.

Figure 3B:
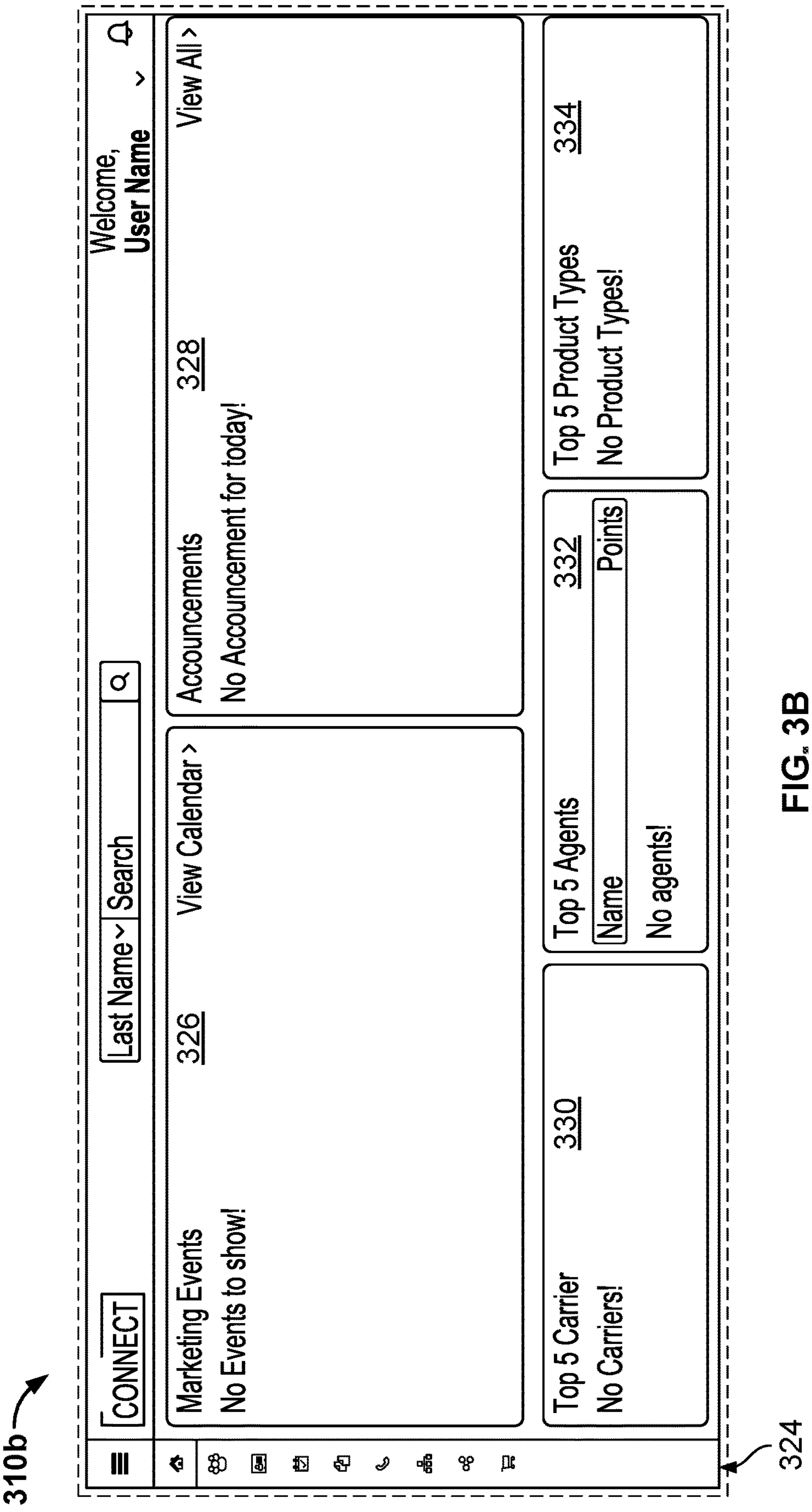
FIG. 3B shows additional sections of the home page of FIG. 3A.

FIG. 3B shows a user interface 310*b* representing a portion of the user interface 310*a* of FIG. 3A. In some implementations, the user interface 310*b* can be accessed from the user interface 310*a* by scrolling on the user interface 310*a* until the user interface 310*b* is shown. The user interface 310*b* can, for example, be displayed on the computing device 202. For example, the computing device 202 can receive information from the server system 204 over the internet or another network. A browser executing on the computing device 202 then can, for example, render the information received from the server system 204 to provide the user interface 310*b*. As with the user interface 210 and the user interface 310*a*, the user interface 310*b* can be a dashboard interface that shows a dashboard tile view of a list of agency metrics for a given insurance agency, and facilitates the navigation of a user through the agency management system.

The user interface 310*b* displays a marketing events dashboard tile 326 that illustrates a list of upcoming marketing events and details regarding the upcoming marketing events. The details that can be displayed include an event name, a location, a date and time, and event recipients or invitees. The marketing events dashboard tile 326 can also illustrate a calendar view that shows the marketing events in a calendar and/or a calendar view icon that can be selected to change the list view into a calendar view.

The user interface 310*b* displays an announcements dashboard tile 328 that illustrates announcements from the insurtech provider for the user. The announcements can be listed and are managed by the insurtech provider to control a number of announcements displayed to the user at the dashboard interface.

The user interface 310*b* also displays a top five carriers dashboard tile 330 that lists the five carriers that have the most policy applications issued in the past 12 months, for example.

The user interface 310*b* also displays a top five agents dashboard tile 332 that lists the five agents that have the most incentive points associated with the agent listed. In some aspects, the incentive points can be customizable by a user where the user defines their own point structure around policies sold, the associated product types and points generated either from (a) individual app counts or (b) annualized premiums. Users have the ability to define customized thresholds to determine how many points an agent earns. For example, a user could set a rule that says an agent earns "1 point per Medicare Supplement application sold", and an agent will earn "0.675 points for $10,000 of annualized annuity premium". The rules can be defined by calendar year. As such, historical point calculations are achievable to assess an agent's productivity over time, based on the rules defined by the user. The system can allow for unlimited rule configurations and the system maintains current totals for all agents that have active or pending policies in a given calendar year. This facilitates the user's ability to quickly and easily keep track of their top producers.

In some aspects, the top five agents can be listed based on an agent score. The agent score will be described in further detail below, and includes an aggregated score that is based on the agent's performance.

The user interface 310*b* also displays a top five product types dashboard tile 334 that lists the five product types that have the most policy applications issued in the past 12 months.

In some aspects, the user interface 310*a* and the user interface 310*b* can include a production reporting dashboard tile. The production reporting dashboard tile can display production results. The production results can include reported and reportable revenue data, the revenue data can be received from the one or more input sources 105. The revenue data can be received directly or indirectly from the one or more input sources 105. For example, the one or more input sources 105 can provide revenue data to the system 100 or the system 100 can determine revenue data from information that the one or more input sources 105 provide (e.g., policy information documents). The production reporting dashboard tile can display production and productivity results for the agency, for one or more agents, for both the agency and a group of selected agents, and for combinations thereof.

Figure 4A:
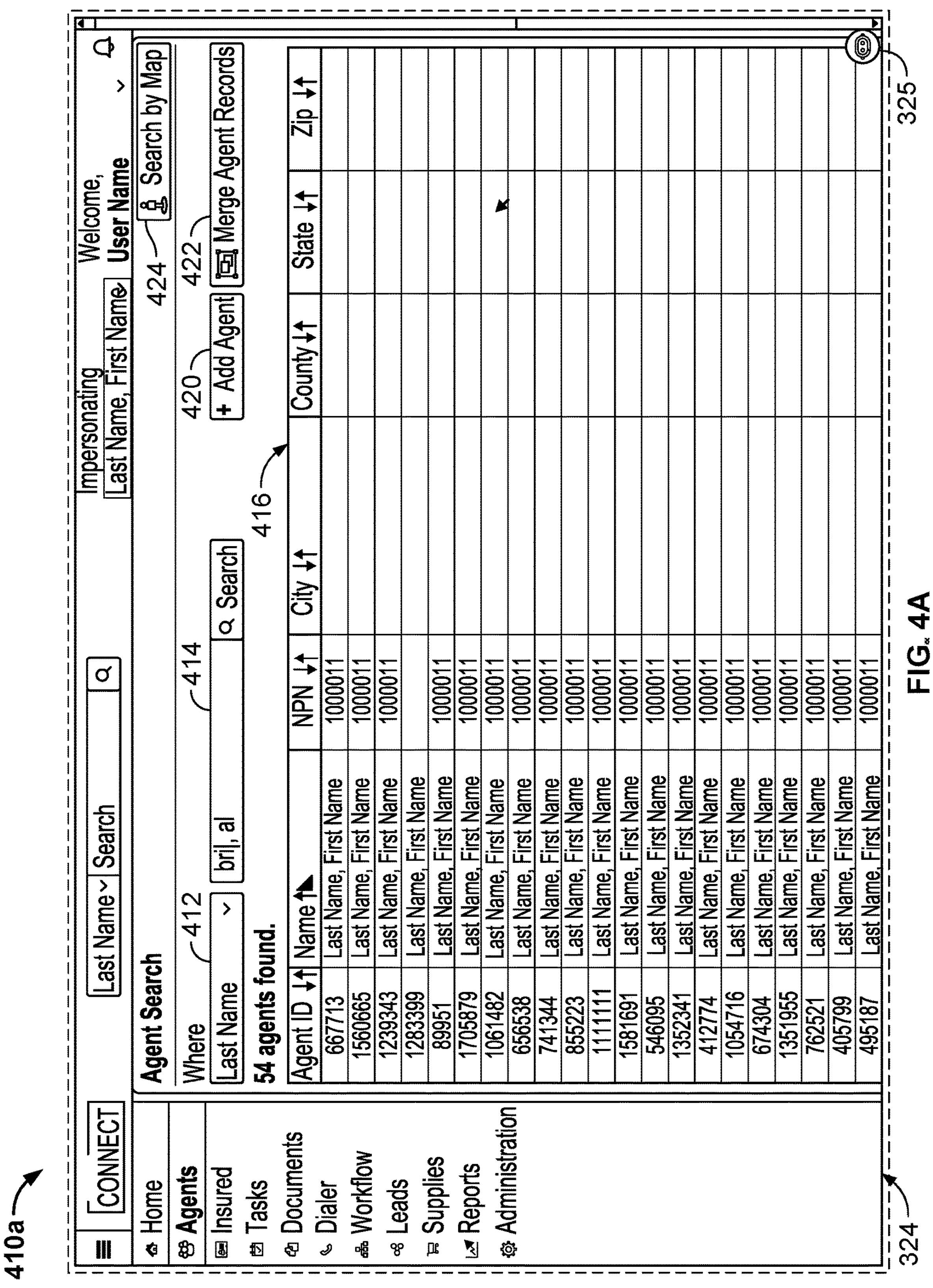
FIG. 4A shows an example user interface for searching among insurance agents.

FIG. 4A shows an example user interface 410*a* that is displayed in response to, for example, selection of the "Agents" tab in the navigation bar 324. The user interface 410*a* allows a user (e.g., at the FMO) to search for insurance agents matching a selected set of criteria. In some implementations, the user interface 410*a* can improve the efficiency of a FMO by facilitating a streamlined navigation and selection of one or more insurance agents that meet selected criteria, including those that are selected to suitable match with particular insurance carriers and or particular types of policies output by an insurance carrier in a selected geographic region. The user interface 410*a* can, for example, be displayed on the computing device 202 of FIG. 2. For example, the computing device 202 can receive information from the server system 204 over the internet or another network. A browser executing on the computing device 202 then can, for example, render the information received from the server system 204 to provide the user interface 410*a*. Specifically, the user interface 410 enables an insurtech provider to facilitate, manage, and track the performance of insurance agents engaged with the insurtech provider by improving the efficiency of locating an appropriate insurance agent for a particular lead, improving the management of tasks for agents and administrators, and by improving the efficiency of document management within the insurtech provider and between the insurance providers and those insurance agents contracted with the insurance providers.

The user interface 410*a* allows the user to search for one or more insurance agents based on a selectable criteria 412. The selectable criteria 412 can include a drop down menu that displays a plurality of selectable criteria that a user can select based on the user's search preferences. For example, the search criteria can include a last name of the agent, an agent number, an agent ID, contact options, an agency name, an email, a national product number (NPN), a phone number, a social security number, or a tax identification number (TIN). The user can select at least one criteria from the selectable criteria 412 and enter search inputs into a search input area 414.

In response to the selectable criteria 412 and the user inputs in the search input area 414, the user interface 410*a* populates a search result area 416 with results that conform to the search inputs from the user. The search result area 416 includes a list view of results of one or more agents that conform to the search inputs of the user. Each result can include an agent identification (ID) number, a name, an NPN, a city, a county, a state, a zip code, among other results. Each agent name can be user-selectable to display additional details about the agent, to provide the ability to select and contact the agent, and to pair the agent with a task such as managing an incoming customer, contracting with a new carrier, etc.

The user interface 410*a* also presents a user with the ability to add an agent 420 and to merge agent records 422. The ability to add an agent 420 can provide an easy access point for a user to add an agent that may not appear in the search criteria, but the user believes that they should. The ability to merge agent records 422 facilitates a streamlined interface by allowing the user to identify and merge duplicate or repetitive results.

Figure 4B:
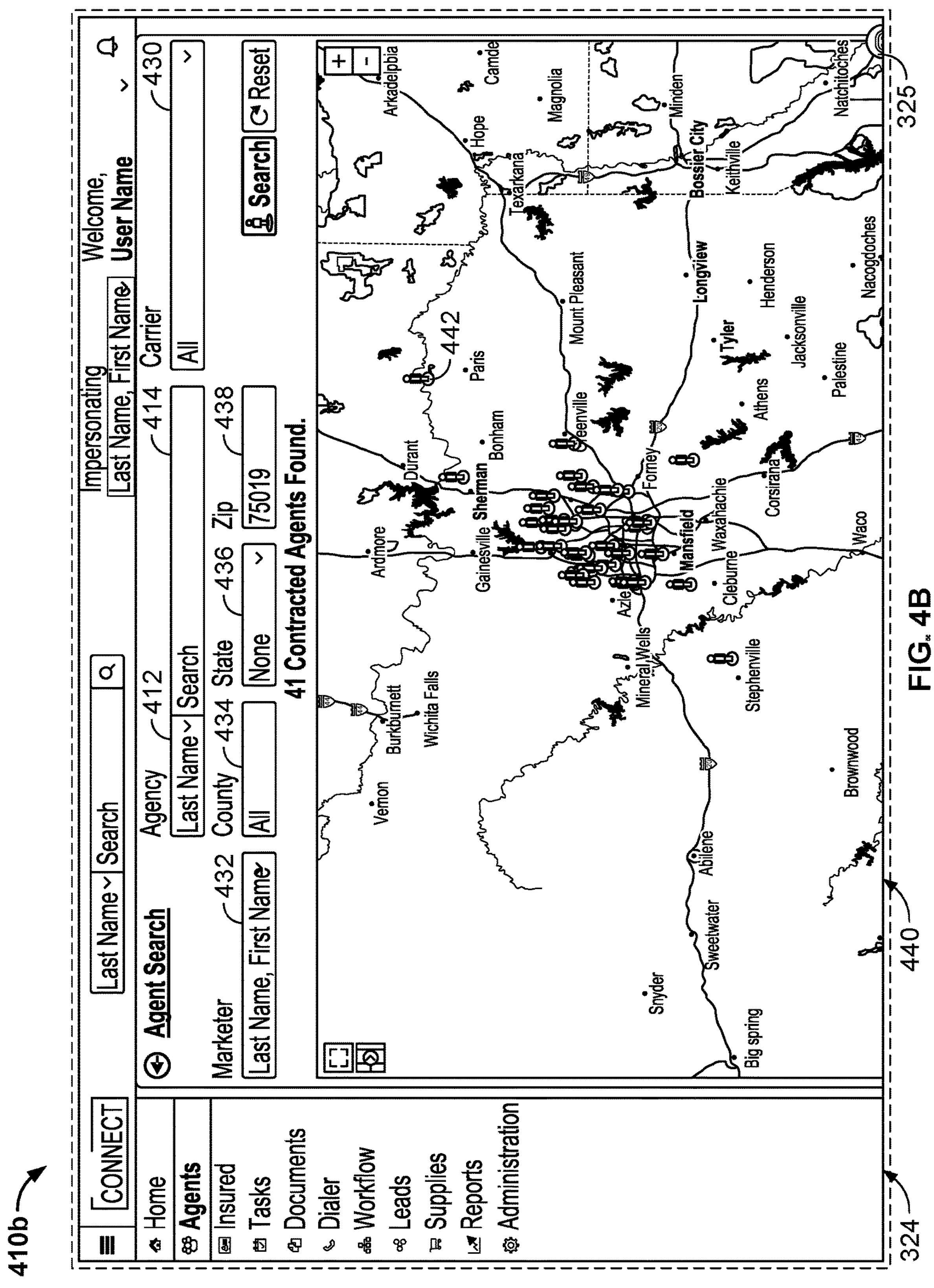
FIG. 4B shows an example user interface for searching for insurance agents with an improved interactive map interface.

The user interface 410*a* also presents the user with the ability to change the view of the search result area 416 from a list view in the search result area 416 to an onscreen, interactive map at an example user interface 410*b* shown in FIG. 4B.

FIG. 4B shows the example user interface 410*b* that allows a user at the insurtech provider to search for insurance agents. In some implementations, the user interface 410*b* can improve the efficiency of a FMO by facilitating a streamlined navigation and selection of one or more insurance agents that are best suited for particular customers including insurance carriers and policy holders. The user interface 410*b* can, for example, be displayed on the computing device 202 of FIG. 2. For example, the computing device 202 can receive information from the server system 204 over the internet or another network. A browser executing on the computing device 202 then can, for example, render the information received from the server system 204 to provide the user interface 410*b*.

The user interface 410*b* allows the user to search for one or more insurance agents based on one or more search areas including a selectable criteria 412, a carrier selection area 430, a marketer selection area 432, a county selection area 436, and a zip code search area 438. The selectable criteria 412 can include a drop down menu that displays a plurality of selectable criteria that a user can select based on the user's search preferences. For example, the search criteria can include a last name of the agent, an agent number, an agent ID, contact options, an agency name, an email, a national product number (NPN), a phone number, a social security number, and/or a tax identification number (TIN). The user can select at least one criteria from the selectable criteria 412 and enter search inputs into a search input area 414.

The user interface 410*b* includes a carrier selection area 430 that allows a user to search for agents based on one or more carriers that the agent is contracted with. The carrier selection area 430 can include a drop down list of relevant carriers serviced by the FMO. The user interface 410*b* includes the marketer selection area 432 that allows a user to select a marketer to limit the search area by. The user interface 410*b* includes a county search area 434 that receives user inputs for the name of a county that the user intends to include in the search results. The user interface 410*b* includes a state selection area 436 that can include a drop down menu of a listing of states that the user can select a state from. The user interface 410*b* includes a zip code search area 438 that allows a user to enter a zip code that the user intends to have included in the search results.

In response to the selectable criteria 412, the user inputs in the search input area 414, the carrier selection area 430, the marketer selection area 432, the county search area 434, the state selection area 436, and the zip code search area 438, the user interface 410*b* populates an interactive map interface 440 with results that conform to the search inputs from the user. The interactive map interface 440 populates the search results and displays the results in the interactive map interface 440 so that the search results are geographically represented in an area on the interactive map interface 440 that corresponds to the agent result. Each agent result can be represented as an agent icon 442 geographically positioned in the interactive map interface 440. Each agent icon 442 is user-selectable to display additional details about the agent, to provide the ability to select and contact the agent, and to pair the agent with a task such as managing an incoming customer, contracting with a new carrier, etc.

The interactive map interface 440 can allow the search results to continually update and populate. For example, the interactive map interface 440 can display additional results or more specific results based on a user's inputs to navigate on the map by zooming in or out and by panning north, south, east, or west. Additionally, the interactive map interface 440 can automatically update the area displayed in response to updated search criteria at any of the user inputs in the search input area 414, the carrier selection area 430, the marketer selection area 432, the county search area 434, the state selection area 436, and the zip code search area 438.

The user interfaces 410*a* and 410*b* can each display an agent score with each of the search results. Additionally, the user interfaces 410*a*, 410*b* can prioritize the search results based on the respective agent scores for each insurance agent. The agent score can be associated with each agent profile, the agent profile tracks the metrics of each agent tracked within the system. The agents metrics can include a volume of contracts sold, a number of policy types sold, an agent debt among other metrics. The agent debt can refer to the amount of commissions owed by the insurance agent to the FMO. In some aspects, insurance agents are obligated to contribute a portion of commissions to the FMO as compensation for the FMO's role in facilitating improved sales for the agent. The agent's debt can be an amount owed by the agent at any given point in time, and can contribute to the agent's score. The respective agent score can be calculated for each insurance agent, the agent score being calculated based on the agent metrics, and the respective agent score can be assigned to each agent profile.

The user interfaces 410*a* and 410*b* enable an insurtech provider to facilitate, manage, and track the performance of insurance agents engaged with the insurtech provider by improving the efficiency of locating an appropriate insurance agent for a particular lead, improving the management of tasks for agents and administrators, and by improving the efficiency of document management within the insurtech provider and between the insurance providers and those insurance agents contracted with the insurance providers. The user interface 410*b* includes the interactive map interface 440 that facilitates a streamlined approach to locating insurance agents within a specific geographic area and illustrating where the agents are located, along with relevant information regarding each agent such as the agent score that can streamline a decision-making process by highlighting the best agents for a user's search criteria.

The user interfaces 410*a* and 410*b* (or other user interfaces) can display additional agent metrics that are associated with each agent profile. For example, a user can display an agent's profile, and the agent profile can include agent activities that the agent is undertaking. In some aspects, the agent activities can be received from the input sources 105, and the agent activities can include leads the agent is working, quotes the agent is running, and enrollments the agent has submitted. The additional agent metrics can provide a user additional insights regarding the agent's activities [0072]. The user interfaces 410*a* and 410*b* (or other user interfaces) can display one or more agent groups. The one or more agent groups can be customizable and can associate one or more agent profiles with one or more agent groups. The agent groups can facilitate agent organization. For example, the agent groups can allow agents to be organized into a "reporting hierarchy" which is different from a "commission hierarchy". The reporting hierarchy can refer to an organization of agents based on who the agents report to. A commission hierarchy can refer to an organization of agents based on commission levels and commission amounts. The one or more agent groups allows users to define which organization an agent belongs and at what level in the reporting hierarchy and the commission hierarchy.

Figure 5:
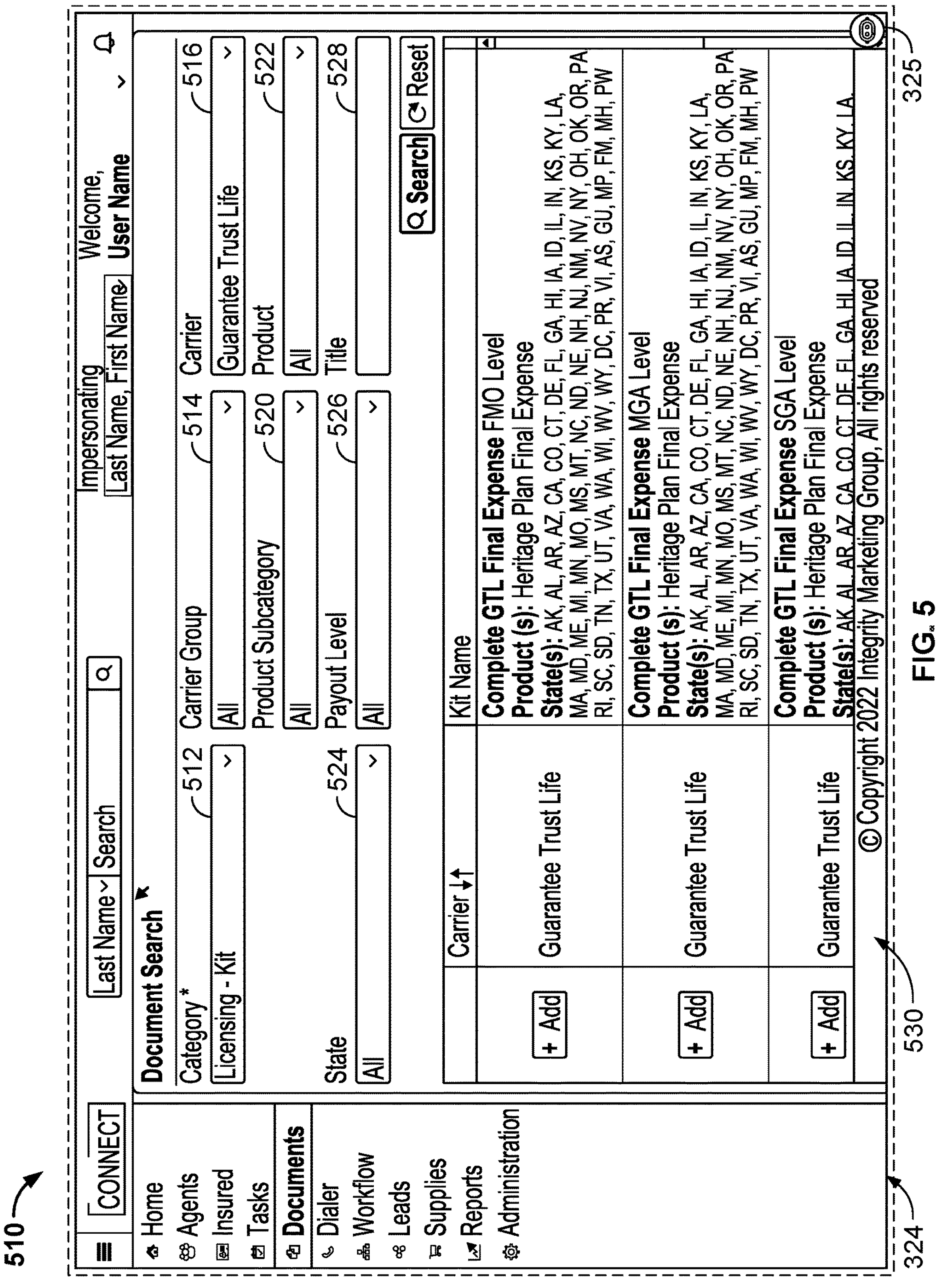
FIG. 5 shows an example user interface for searching for documents for facilitating agency management.

FIG. 5 shows an example user interface 510 that is displayed in response to, for example, selection of the "Documents" tab in the navigation bar 324. The user interface 510 allows a user at the FMO to search for documents. In some implementations, the user interface 510 can improve the efficiency of a FMO by facilitating a streamlined navigation and selection of one or more documents for particular customers, insurance agents, and insurance carriers. The user interface 510 can, for example, be displayed on the computing device 202 of FIG. 2. For example, the computing device 202 can receive information from the server system 204 over the internet or another network. A browser executing on the computing device 202 then can, for example, render the information received from the server system 204 to provide the user interface 510

The user interface 510 includes a category selection area 512 that includes a plurality of document categories that are user-selectable. The document categories include at least a company external kit, a company internal kit, licensing, licensing kit, other, supplies, supplies sales kit, among other document categories, The user interface 510 includes a carrier group selection area 514 that includes a drop down list of relevant carriers engaged with the FMO or otherwise serviced by the FMO. The user interface 510 includes a carrier selection area 516 that includes a drop down list of relevant carriers, the carriers can include Aetna, Americo, Foresters, among many others.

The user interface 510 includes a product subcategory selection area 520 can include a drop down list that includes affordable care act (ACA), accident, accident life, alternative long term care (LTC), annuity, cancer, critical illness, deferred income annuity, dental/vision/hearing, disability income, emergency transport, final expense, fixed, fixed indexed, funeral trust—annuity, funeral trust—multi pay, funeral trust—single pay, group, guaranteed universal life, hospital indemnity plan, hybrid life, hybrid life & annuity, indexed universal life, life, major medical, Medicare advantage, Medicare supplement, part D, preneed annuity, preneed mortal remains, preneed—multi pay, preneed single pay, short term care, simplified issue, single premium immediate annuity, supplemental, term, term life express, traditional long term care, traditional single pay, universal life, unknown enrollment, unknown policy, whole life, worksite, among other product subcategories.

The user interface 510 includes a product selection area 522 that allows a user to select from one or more products listed. The user interface 510 includes a state selection area 524 that can include a drop down menu of a listing of states that the user can select a state from. The user interface 510 includes a payout level selection area 526 that can include a drop down list of various payout levels. The user interface 510 includes a title selection area 528 where a document title can be entered.

In response to the search inputs in the various document selection search criteria fields, the user interface 510 populates a document search result area 530 with results that conform to the search inputs from the user. The search result area 530 includes a list view of results of one or more documents that conform to the search inputs of the user. Each result can include a carrier and a kit name. The kit name describing the name of the document kit, the products covered, and the relevant states.

In some implementations, the user interface 510 at the documents tab can facilitate a search and complete function for a user where a user searches for a document or set of documents, and the documents tab facilitates the locating and sending of one or more documents or kits to an agent via email. For example, a user may be interested in pairing an agent with a carrier that the agent is not yet contracted with. The user interface can pull the appropriate application documents and email the documents to the agent allowing a user to complete the application document for submission back to the FMO for review and approval. In some aspects, a user can generate and send a hyperlink to an agent, the hyperlink can be selected by the agent that can allow the agent to click and fill out online contracting information that can be submitted to multiple carriers. The online contracting information can include a form-fillable document that includes one or more fillable areas that a user can fill to complete the form. Base agent information (e.g., an agent name, address, service area, among other agent information)

can be stored and can be recalled for use for future documents without the user or the agent re-entering the same base information.

In some implementations, the user interface (e.g., via a certification interface) can facilitate the management of one or more licenses to ensure compliance of insurance agents with regulating bodies such as the National Insurance Producer Registry (NIPR). The system can monitor the compliance of each insurance agent by tracking the licenses of each insurance agent. The tracking of the licenses can ensure that the licenses are active and have not expired, and the system can facilitate communication between the insurance agent and the regulating body if and when the insurance agent's license is up for renewal. In some aspects, the certification interface can facilitate the management of one or more licenses with NIPR by allowing the user to update a state appointment status from NIPR.

Figure 6:
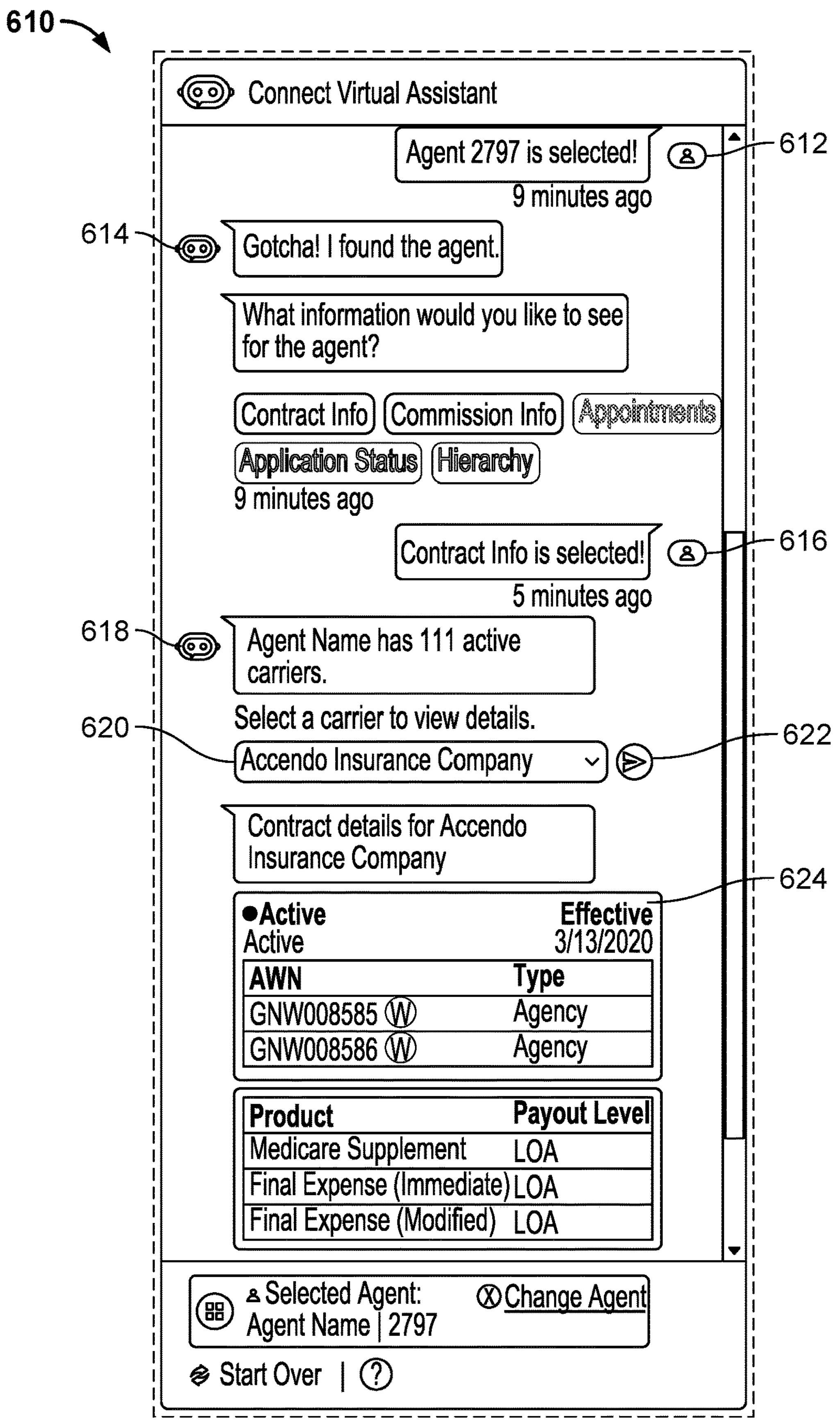
FIG. 6 shows an example user interface with a digital assistant for facilitating agency management.

FIG. 6 shows an example user interface 610 that is displayed in response to, for example, selection of a virtual assistant button (e.g., virtual assistant button 325 shown in FIGS. 4A, 4B, and 5). The user interface 610 facilitates intuitive guidance of a user to data in the system that would otherwise be accessed via navigation of the system and user interfaces described above. The user interface 610 facilitates the intuitive guidance by implementing artificial intelligence (AI) to more efficiently navigate the data for the user. The user interface 610 can provide prompts and responses to user inputs that assist the user in navigating the system without specifically navigating through multiple user interfaces. The user interface 610 provides the user with an intuitive and effective tool for using the system to improve the efficiency and effectiveness of the insurtech provider. While the user interface 610 illustrates an exemplary series of prompts and responses, it should be appreciated that a variety of prompts and responses can be displayed at user interface 610 to assist the user by guiding the user to the data based on the user's inquires and responses.

The user interface 610 displays a first user input 612 that is a selection of an agent. For example, a user can select an agent based on an agent ID, by searching for an agent name, by searching for an agent ID, or by otherwise searching for an agent using the virtual assistant in the user interface 610. In response to the selection of an agent by the first user input 612, the user interface 610 displays a first response 614. The first response 614 includes an acknowledgement of the agent selected by the first user input 612 and a prompt to the user inquiring what information the user would like to see for the agent. The prompt can include one or more selectable criteria for the user to select. The one or more selectable criteria include contract information, commission information, appointments, application status, and hierarchy.

Each of the one or more selectable criteria in the first response 614 can be selected by the user in a second user input 616. The second user input 616 can select one or more of the user-selectable criteria from the first response 614. For example, the user can select the contract information with the second user input 616. In response to the second user input 616, the user interface 610 can display a second response 618. The second response 618 can display a number of active carriers that the selected agent from the first user input 612. For example, the selected agent can have a number of carriers that the agent is contracted with, which can indicate the ability of the agent to sell a policy for the carriers that the agent is contracted with.

The user interface 610 can display a second prompt 620 that follows the second response 618. For example, the second prompt 620 can display a drop down selection area that includes a list of the carriers that the agent is contracted with. The drop down selection area of the second prompt 620 can allow a user to select an insurance carrier 622 to display additional details. For example, the user can select Accendo Insurance Company, and the user interface 610 can display contract details 624 for Accendo Insurance Company in response to the user selection.

Figure 7:
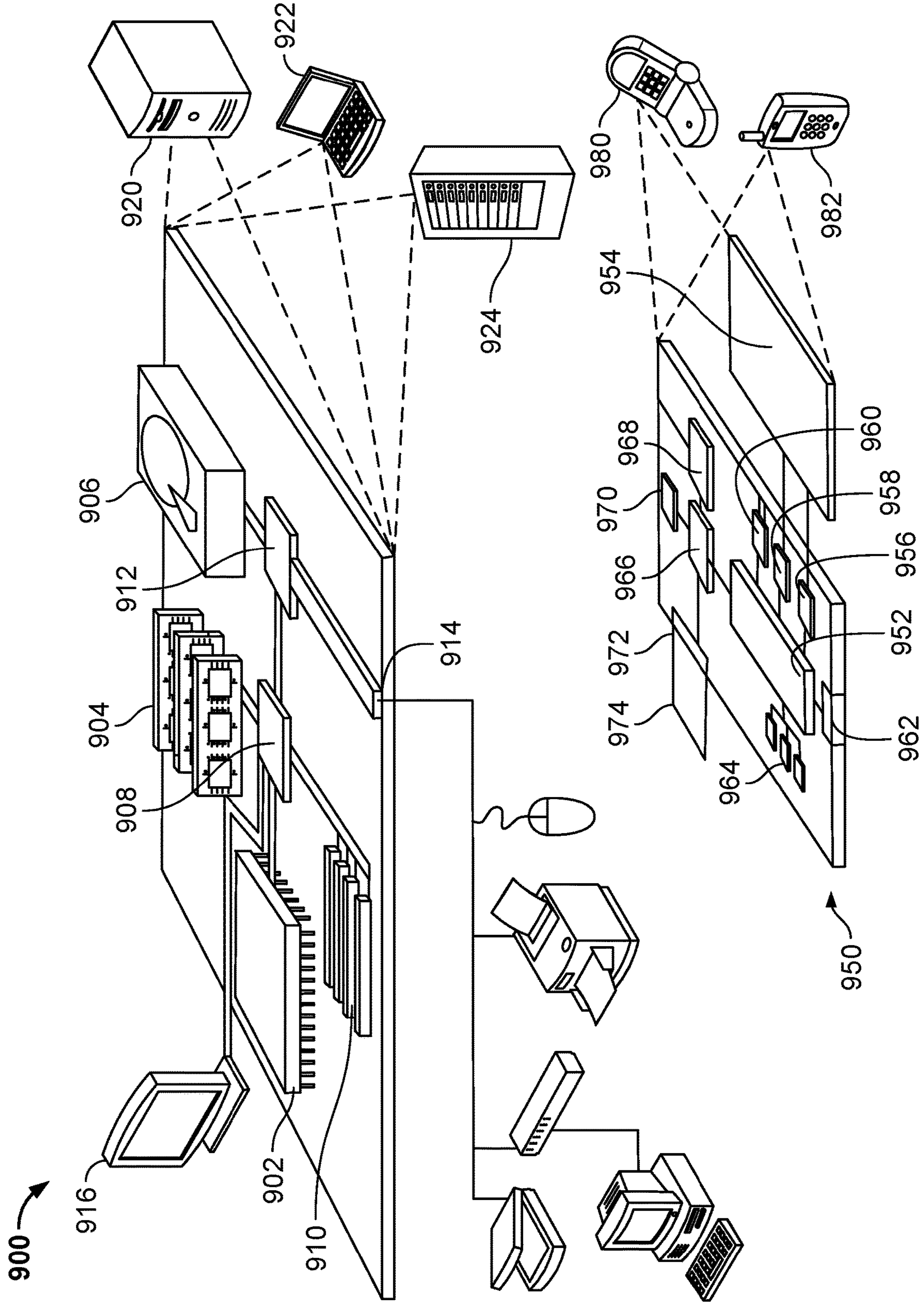
FIG. 7 is a block diagram of computing devices that may be used to implement the systems and methods described in this document, as either a client or as a server or plurality of servers.

FIG. 7 shows an example of a computing device 900 and an example of a mobile computing device that can be used to implement the techniques described herein. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provided as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980.

It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a LCD (liquid crystal display) display screen for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. An improved onscreen interactive agent icon map method that repopulates agent icons responsive to one or more zoom or pan navigation inputs, comprising:

responsive to a request from a private network computing system that is authenticated by an identification service in a public network, using an application programming interface (API) gateway of the public network to transmit agent identification data for a plurality of agents to the private network computing system, wherein the private network computing system comprises a database of agent profiles responsive to a first remote computing device prompting the private network computing system with agent search criteria, populating an interactive agent icon map at an onscreen user interface of the first remote computing device to include a result set of geographically positioned interactive agent icons that are individually selectable onscreen to change the onscreen user interface at the first remote computing device, wherein the result set of geographically positioned interactive agent icons graphically represent a subset of the agent profiles from said database at the private network computing system having computer-generated prioritization based at least partially upon agent debt values within said database at the private network computing system; and responsive to the one or more zoom or pan navigation inputs on the interactive agent icon map at the onscreen user interface of the first remote computing device, repopulating the interactive agent icon map at the onscreen user interface of the first remote computing device to include an updated result set of geographically positioned interactive agent icons in the interactive agent icon map that is based on both the one or more zoom or pan navigation inputs and an updated subset of the agent profiles from said database at the private network computing system having said computer-generated prioritization based at least partially upon agent debt values within said database at the private network computing system.

2. The improved onscreen interactive agent icon map method of claim 1, wherein each agent profile within said database at the private network computing system includes agent metrics received via application programming interface (API) gateway of the public network and a respective agent score generated at the private network computing system based upon said agent metrics.

3. The improved onscreen interactive agent icon map method of claim 2, wherein the private network computing system generates the respective agent score based at least partially upon said agent debt values within said database at the private network computing system.

4. The improved onscreen interactive agent icon map method of claim 1, wherein said result set of geographically positioned interactive agent icons are individually selectable onscreen to change the onscreen user interface at the first remote computing device so that the onscreen user interface provides agent metrics for a selected interactive agent icon and a prompt to communicate with an agent represented by the selected interactive agent icon.

5. The improved onscreen interactive agent icon map method of claim 4, further comprising, responsive to updated agent search criteria input into one or more user-selectable fields at the onscreen user interface of the first remote computing device, automatically repopulating the interactive agent icon map at the onscreen user interface of the first remote computing device to include a second updated result set of geographically positioned interactive agent icons in the interactive agent icon map that is based on both the updated agent search criteria and a second updated subset of the agent profiles from said database at the private network computing system having said computer-generated prioritization based at least partially upon agent debt values within said database at the private network computing system.

6. The improved onscreen interactive agent icon map method of claim 5, wherein said updated agent search criteria is input into the one or more user-selectable fields of the onscreen user interface of the first remote computing device using a drop down menu contemporaneously onscreen with said interactive agent icon map at said onscreen user interface of the first remote computing device.

7. The improved onscreen interactive agent icon map method of claim 5, further comrising inputting said updated agent search criteria into the one or more user-selectable fields of the onscreen user interface of the first remote computing device based a county search parameter, a state search parameter, or a zip code search parameter.

8. The improved onscreen interactive agent icon map method of claim 1, wherien the onscreen user interface of the first remote computing device is configured to toggle from said the interactive agent icon map to an artificial intelligence system that navigates a user through prompts to search for agents metrics a selected agent profile within said database at the private network computing system.

9. The improved onscreen interactive agent icon map method of claim 8, further comprising, subsequent to user selection of a toggle button contemporaneously onscreen with said interactive agent icon map at said onscreen user interface of the first remote computing device, prompting the user with an inquiry from the artificial intelligence system for a specifc type of agent metric that is requested for the selected agent profile within said database at the private network computing system.

10. The improved onscreen interactive agent icon map method of claim 9, wherein said prompting the user with the inquiry from the artificial intelligence system for the specifc type of agent metric comprises an onscreen prompt having one or more selectable criteria buttons.

11. The improved onscreen interactive agent icon map method of claim 9, further comprising obtaining the agent metric using the artificial intelligence system for the selected agent profile within said database at the private network computing system.

12. The improved onscreen interactive agent icon map method of claim 1, wherien the onscreen user interface of the first remote computing device is configured to toggle from said the interactive agent icon map to an agent search interface having a list view of said subset of the agent profiles from said database at the private network computing system or said updated subset of the agent profiles from said database at the private network computing system.

13. The improved onscreen interactive agent icon map method of claim 12, wherien the agent search interface comprises a search-by-map selectable field to toggle to the onscreen user interface of the first remote computing device to interactive agent icon map at said onscreen user interface of the first remote computing device.

* * * * *